United States Patent
Barajas Vargas et al.

(10) Patent No.: US 10,439,954 B1
(45) Date of Patent: Oct. 8, 2019

(54) VIRTUAL-ENTERPRISE CLOUD COMPUTING SYSTEM

(71) Applicant: EMC IP Holding Company LLC, Hopkinton, MA (US)

(72) Inventors: Ivan A. Barajas Vargas, Raleigh, NC (US); Rui Liao, Chengdu Tianfu New Zone (CN); Biao Yan, Chengdu Jinjiang Zone (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 14/980,490

(22) Filed: Dec. 28, 2015

(51) Int. Cl.
*G06F 15/16* (2006.01)
*H04L 12/911* (2013.01)
*H04L 12/46* (2006.01)
*H04L 29/08* (2006.01)

(52) U.S. Cl.
CPC .......... *H04L 47/70* (2013.01); *H04L 12/4641* (2013.01); *H04L 67/10* (2013.01)

(58) Field of Classification Search
CPC ...... H04L 47/70; H04L 12/4641; H04L 67/10
USPC ........................................................ 709/218
See application file for complete search history.

(56) References Cited

U.S. PATENT DOCUMENTS

| | | | | |
|---|---|---|---|---|
| 9,098,785 | B2 * | 8/2015 | Slavin ................. | G06Q 20/3274 |
| 2008/0173709 | A1 * | 7/2008 | Ghosh .................... | G06F 21/34 |
| | | | | 235/382 |
| 2013/0138810 | A1 * | 5/2013 | Binyamin ............. | G06F 9/5072 |
| | | | | 709/225 |
| 2015/0128230 | A1 * | 5/2015 | Chang ................... | H04W 12/04 |
| | | | | 726/5 |
| 2015/0373012 | A1 * | 12/2015 | Bartz .................. | H04L 63/0823 |
| | | | | 726/7 |
| 2016/0094546 | A1 * | 3/2016 | Innes .................. | H04L 63/0823 |
| | | | | 713/156 |
| 2016/0261592 | A1 * | 9/2016 | Hubert .................... | G06F 21/53 |

(Continued)

OTHER PUBLICATIONS

A. J. Choudhury, P. Kumar, M. Sain, H. Lim and H. Jae-Lee, "A Strong User Authentication Framework for Cloud Computing," 2011 IEEE Asia-Pacific Services Computing Conference, Jeju Island, 2011, pp. 110-115. (Year: 2011).*

(Continued)

*Primary Examiner* — Taylor A Elfervig
(74) *Attorney, Agent, or Firm* — BainwoodHuang

(57) ABSTRACT

A cloud computing system includes a first set of network computers providing a pool of virtual-enterprise resources integrated from lower-level cloud infrastructure including software as a service, platform as a service and infrastructure as a service. A second set of network computers form a soft gate providing access to the pool of virtual-enterprise resources by enterprise users accessing the cloud computing system via an external network. A third set of network computers form a business box providing for creation, management and use of certification cards to define the virtual-enterprise resources and to control use of the virtual-enterprise resources by the enterprise users. The soft gate and business box implement a card-creation flow that creates customized certification cards, and a card-usage flow that validates user privileges based on presentation of certification cards as a condition to granting access to virtual-enterprise resources.

18 Claims, 5 Drawing Sheets

(56) References Cited

U.S. PATENT DOCUMENTS

2017/0093918 A1* 3/2017 Banerjee ............... H04L 63/101

OTHER PUBLICATIONS

Sharma et al., "Cloud SaaS and Model Driven Architecture", Proc. of the International Conference on Advanced Computing and Communication Technologies (ACCT 2011), p. 18-22 (Year: 2011).*

* cited by examiner

VIRTUAL-ENTERPRISE CLOUD COMPUTING SYSTEM

BACKGROUND

The present disclosure is directed to the field of computing systems, and in particular to so-called "cloud" computing systems generally providing abstracted services to remote users using hardware resources that are separately managed and in some cases separately owned.

SUMMARY

Cloud computing, also referred to as "the cloud", relies on sharing of resources to achieve coherence and economies of scale. Cloud computing is based on the concept of converged infrastructure and shared services.

The following are typical deployment models for cloud computing:
1. Private cloud: In this model, the cloud infrastructure is operated for a single organization or enterprise.
2. Public cloud: In this model, services on the cloud are rendered over a network which is open for public use.
3. Community cloud: In this model, the cloud shares infrastructure across several organizations from a specific community with common concerns.
4. Hybrid cloud: In this model, the cloud is a composition of two or more sub-clouds that remain distinct entities but are bound together, aggregating the benefits of multiple deployment models.

Cloud providers (vendors) offer services according to several fundamental models including the following:
1. Infrastructure as a Service (IaaS): In this model, consumers use cloud computing resources such as computing, storage, network component, and midware. Users have a control privilege over their computing resources, but are not the administrator of the cloud basic infrastructure.
2. Platform as a Service (PaaS): In this model, cloud providers deliver a computing platform, for example including an operating system, programming language execution environment, database, and web server. Application developers can develop and run their software solutions on a cloud platform without the cost and complexity of buying and managing the underlying hardware and software layers.
3. Software as a Service (SaaS): In this model, consumers use the applications, ignoring the network infrastructure of operating system or hardware. Cloud providers or vendors lease software services to the users in the form of providing a set of accounts and passwords.

The above description of cloud computing is taken from Wikipedia, https<colon><slash><slash>en.wikipedia.org/wiki/Cloud computing.

There is also an operational model referred to as "IT as a service" or ITaaS, where IT stands for "information technology". Under this model, the IT organization of an enterprise runs much like business, and it acts and operates as a distinct business entity, creating products for other line-of-business (LOB) organizations within the enterprise. An IT organization delivers ITaaS using underlying technology models such as IaaS, PaaS, and SaaS.

According to proponents, ITaaS has numerous and diverse benefits including:
  Minimal upfront IT investment
  Regular, predictable expenses
  Financial transparency
  Tax advantages
  Continuous monitoring of services
  Expert technical support
  Scalability
  Regular software upgrades and patches
  Guarantee of up-to-date hardware From a technical point of view, there are obstacles to widespread and successful deployment of cloud computing. In the past, virtualization, management, security, pricing, and cost recovery were major painful points. Many of these have been improved. However, additional challenges remain as follows:
1. The continual focus on security
2. How an enterprise can deploy the services
3. The availability of ITaaS The present disclosure describes a solution referred to as "virtual enterprise" or V-Enterprise which addresses the above challenges. The V-Enterprise is an elastic and systematic cloud solution, and is also referred to herein as the virtual-enterprise cloud computing system or V-E CCS. It deploys IT resources and services which are integrated from PaaS, IaaS and SaaS. In order to exactly provide the required resources and services to authorized individuals, the V-Enterprise employs an access model based on use of certification cards, along with functional entities including a "soft gate" and a "business box". The business box provides a set of certification cards for different roles in the enterprise and instructs a resource pool manager to build the related resources according to a configuration file. The resources could be virtual objects which can be assigned on demand, and thus distributed according to real requirements. The certification cards define the count and privilege of the resources and services for the owner. The configuration file is generated automatically when the parameters of the certification card are all finalized. An individual provides a card when accessing a corresponding resource or service. The soft gate checks validity of the card and forwards the individual to the specific resource or service distinguished by the privileges identified in the card. The card can be a digital token or a physical card, and the selection of type may depend on the level of security required.

More specifically, a cloud computing system is disclosed for providing network-delivered virtual-enterprise functionality to an enterprise. The cloud computing system includes a first set of network computers providing a pool of virtual-enterprise resources integrated from lower-level cloud infrastructure including software as a service, platform as a service and infrastructure as a service. The software as a service includes department-level applications and services; the platform as a service and infrastructure as a service include virtualized machines and data storage resources on which enterprise applications can be deployed.

A second set of network computers are configured to form a soft gate providing a route of access to the pool of virtual-enterprise resources by enterprise users accessing the cloud computing system via an external network. A third set of network computers are configured to form a business box providing for creation, management and use of certification cards to define the virtual-enterprise resources and to control use of the virtual-enterprise resources by the enterprise users. The soft gate and business box together implement a card-creation flow and a card-usage flow. The card-creation flow creates customized certification cards for the enterprise based on selection and customization of generic certification cards. The card-usage flow provides validation of user privileges based on user presentation of the certification cards as a condition to user access to the virtual-enterprise resources.

Several advantages may be achieved in the disclosed system. Information security can be ensured for the usage of the enterprise and the resource and service accessed through VPN and Intranet. The scope of user privileges can be limited—an individual only can access the resource and services described by a card. The system may be built on the business model of ITaaS, building channels between the individuals in the enterprise and the cloud. It can help enterprises to reduce the budget for IT resources and services. The system may be deployed in several different types of clouds, including: private, community, public or hybrid.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
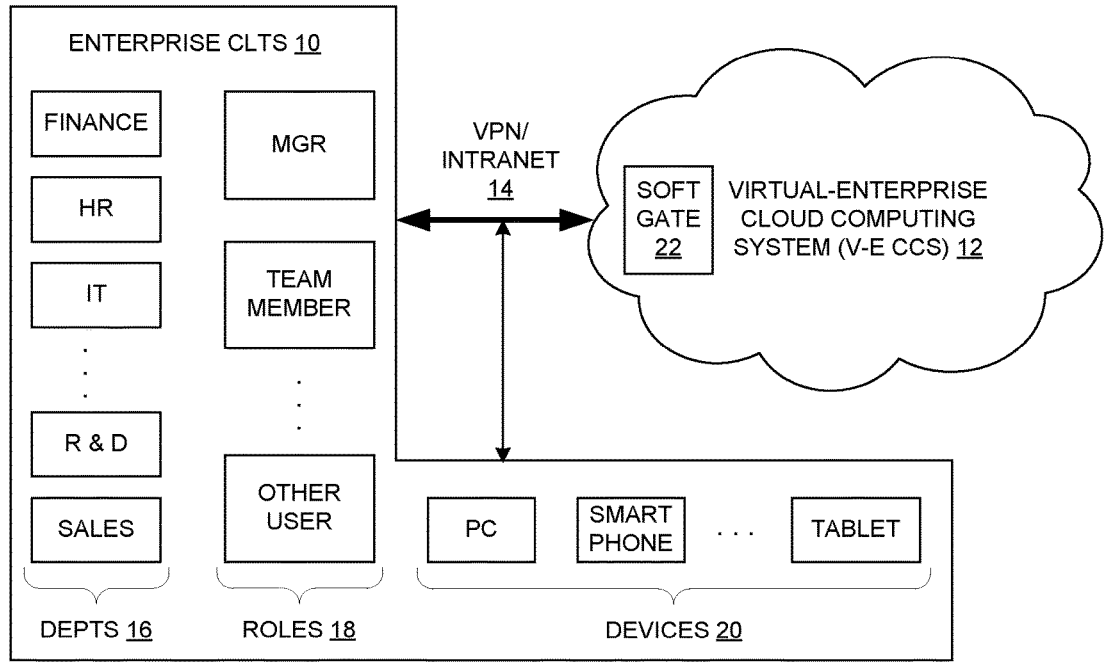
FIG. 1 is a block diagram of an enterprise computing system including a virtual-enterprise cloud computing system.

FIG. 1 shows an organization or enterprise from a computing perspective. At a high level it includes enterprise clients (CLTs) 10, a virtual-enterprise cloud computing system (V-E CCS) 12, and an interconnection shown as a virtual private network (VPN) or intranet 14. The enterprise clients 10 are divided into three categories, departments 16, roles 18 and devices 20. Departments 16 might include typical corporate departments or organizations such as Finance, Human Resources (HR), Information Technology (IT), Research and Development (R&D), Sales, etc. Individuals play different roles 18 such as manager (MGR), team member, etc. Individuals access the V-E CCS 12 via the VPN/intranet 14 to access specific cloud resources and services by respective user devices 20 such as a personal computer (PC), smart phone, tablet computer, etc. Within the V-E CCS 12, access by the enterprise clients 10 is via a specialized computer(s) shown as a soft gate 22.

Figure 2:
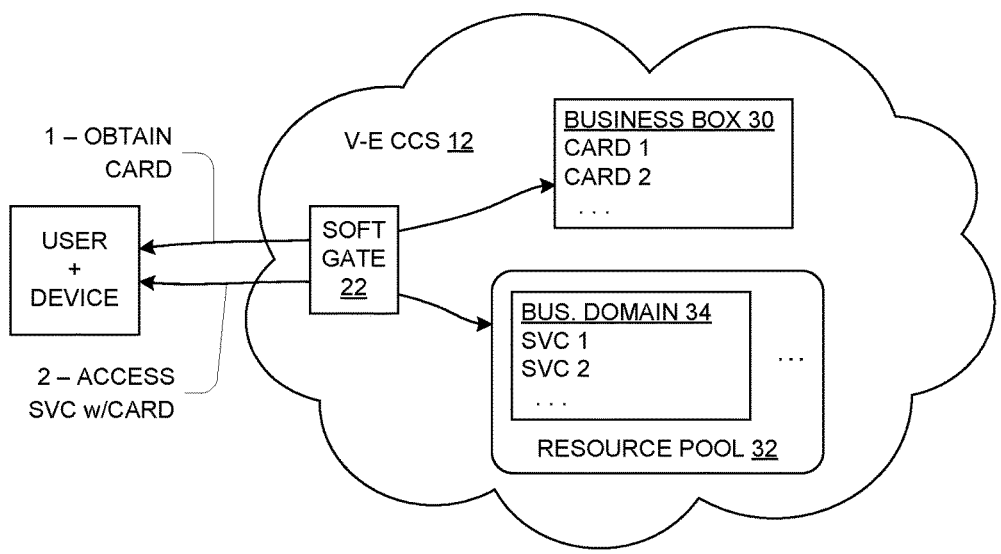
FIG. 2 is a high-level block diagram of a virtual-enterprise cloud computing system.

FIG. 2 shows details of the V-E CCS 12. It includes the soft gate 22, a specialized computer (s) shown as a business box 30, and a resource pool 32. The resource pool 32 includes services and other resources being accessed by the enterprise clients 10. As described more below, the resources become organized into business domains 34 having collections of services (SVCs), e.g., services SVC 1, SVC 2, etc., as shown.

As described more below, the resource pool 32 is built on a cloud infrastructure, deploying integrated resources of platform-as-a-service (PaaS), infrastructure-as-a-service (IaaS), and software-as-a-service (SaaS). The resource pool 32 provides the IT resources and services in the form of business domains 34. The V-E CCS 12 may support multiple enterprises, and in that case the different enterprises have respective distinct business domains 34.

The business box 30 is responsible for the management of items referred to herein as "certification cards" or simply "cards". The V-E CCS 12 provides the enterprise with a suite of generic cards for all departments such as IT, HR, Finance, Sales, etc. Each enterprise can choose the required ones from the suite of generic cards. The cards describe the owners' privileges with respect to the resources and services provided by the V-E CCS 12.

When an enterprise begins using V-E CCS 12, the business box 30 creates the suite of cards, gives them to the enterprise administrators, and informs the resource pool 32 to create a related business domain 34. This process, indicated as "1—Obtain Card" in FIG. 2, is described in more detail below.

When a user wishes to access a resource or service, it sends a request to the soft gate 22 that includes one or more corresponding cards. The soft gate 22 uses the content of the card(s) to validate the privileges of the individuals with respect to the requested resources and to forward the request according to the content of the card. The soft gate 22 may also perform an accounting function such as tracking usage time for communication channels between the individual and the resource. This process, indicated as "2—Access SVC w/Card" in FIG. 2, is described in more detail below.

Figure 3:
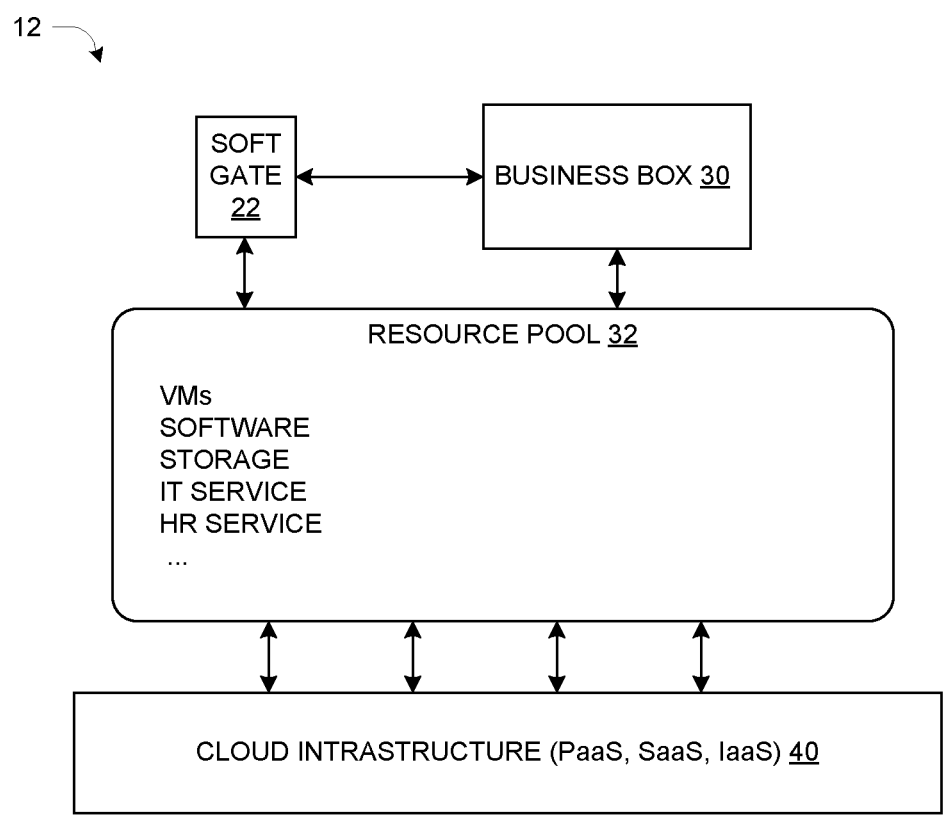
FIG. 3 is a block diagram of a virtual-enterprise cloud computing system showing details of a resource pool and connections to underlying cloud infrastructure.

FIG. 3 shows the architecture of the resource pool 32 and relation to other components. The resource pool 32 manages all the IT resources and services, including virtual machines (VMs), software including application software (applications), data storage, and services such as IT service, HR service, Finance service, etc. All the resources and services are provided by an underlying cloud infrastructure 40 using PaaS, SaaS and IaaS technologies.

Figure 4:
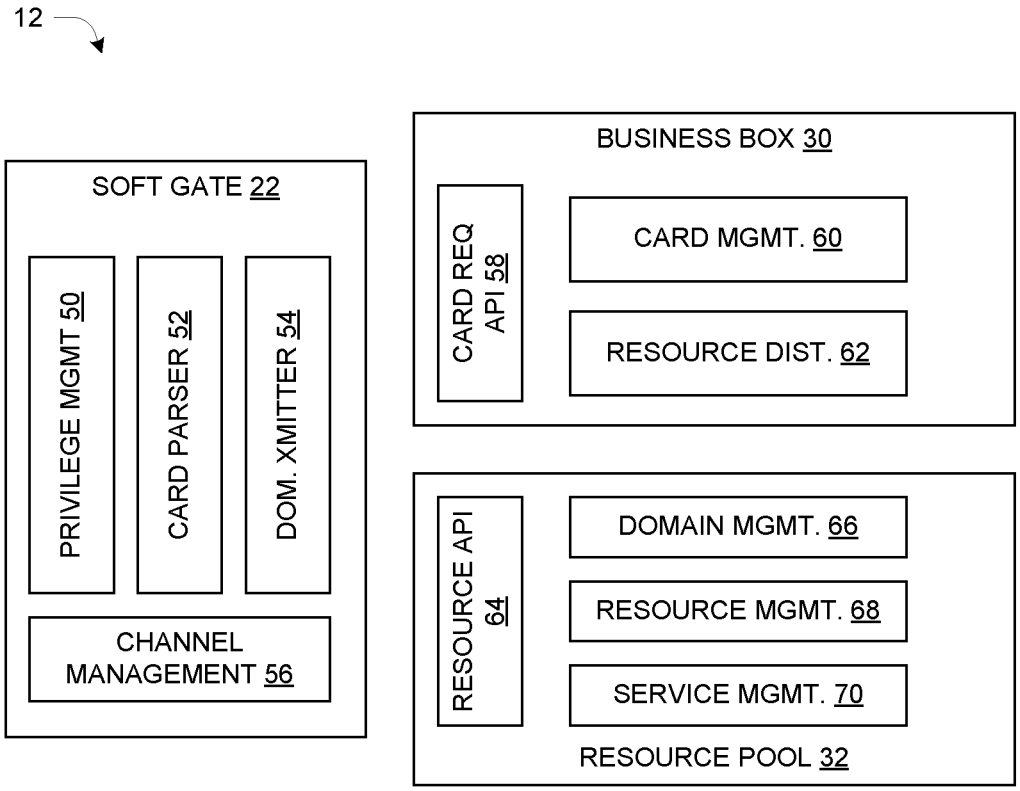
FIG. 4 is a block diagram showing details of a soft gate, business box and resource pool.

FIG. 4 shows a module-level description of a potential implementation of components of the V-E CCS 12.

The following are the modules in soft gate 22:
1. Privilege Management 50. This module is responsible to check the privileges of the individuals' card. If the card is invalid, the soft gate 22 prevents the individual from accessing the resource.
2. Card Parser 52. This module helps to parse the card's information and packages it with the related parameters to a specific packet type which is recognized by the V-E CCS 12.
3. Domain Transmitter 54. This module will send the resource access requirement to the resource pool 32 with specific domain information.
4. Channel Management 56. This module is the time keeper of the communication between the individual and resource.

The following are the modules in business box 30:
1. Card Request API 58. This is the interface between soft gate 22 and business box 30, which is responsible to handle card requirement.
2. Card Management 60. The module creates, modifies and deletes the cards for different roles in different enterprises.
3. Resource Distributor 62. After the resource and service configuration file for specific enterprise is created or updated, this module sends the file to resource pool 32 to build the related Business Domain.

The following are the modules in resource pool 32:
1. Resource API 64. This is the interface for outside request to resource pool 32. These requests involve the creation of Business Domain and resource access.
2. Domain Management 66. This module control all the Business Domains built on the base of resource and service. Each enterprise will generally have only one matched Business Domain in resource pool 32. If the enterprise wants to use its existing IT resource, the domain also keeps such information.
3. Resource Management 68. This module maintains the IT resource including virtual machine, storage, software and etc. It also manages the outside and safe-authenticated IT resource.
4. Business Service Management 70. This module manages the business services, including IT service, HR service, Finance service and etc. It also accepts and manages the outside and safe-authenticated services.

Figure 5:
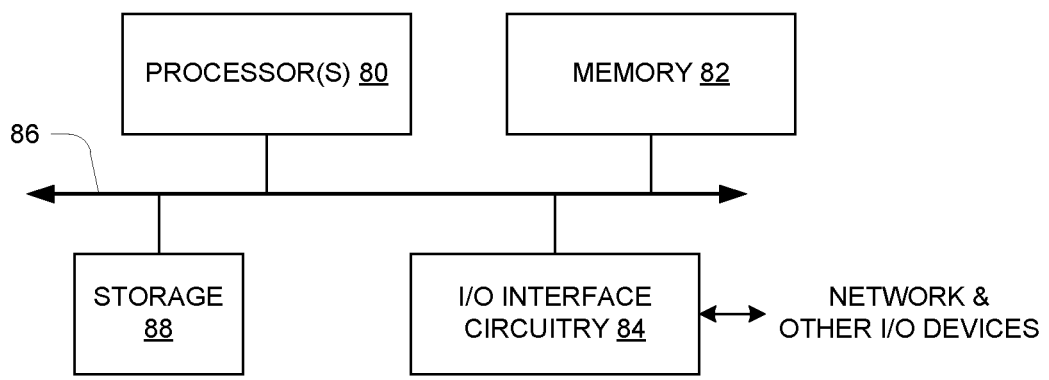
FIG. 5 is a block diagram of a computer from a hardware perspective.

FIG. 5 shows an example configuration of a physical computer from a computer hardware perspective. Each of the soft gate 22, business box 30 and resource pool 32 is generally formed by one or more such physical computers, including network interconnections as necessary. The computer hardware includes one or more processors 80, memory 82, and interface circuitry 84 interconnected by data interconnections 86 such as one or more high-speed data buses. The interface circuitry 84 provides a hardware connection to a network such as VPN/intranet 14 (FIG. 1) and perhaps other external devices/connections (EXT DEVs). The processor(s) 80 with connected memory 82 may also be referred to as "processing circuitry" herein. There may also be local storage 88 such as a local-attached disk drive or Flash drive. In operation, the memory 82 stores data and instructions of system software (e.g., operating system) and one or more application programs which are executed by the processor(s) 80 to cause the hardware to function in a software-defined manner. Thus the computer hardware executing instructions of a soft gate application, for example, can be referred to as a soft gate circuit or soft gate component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 6:
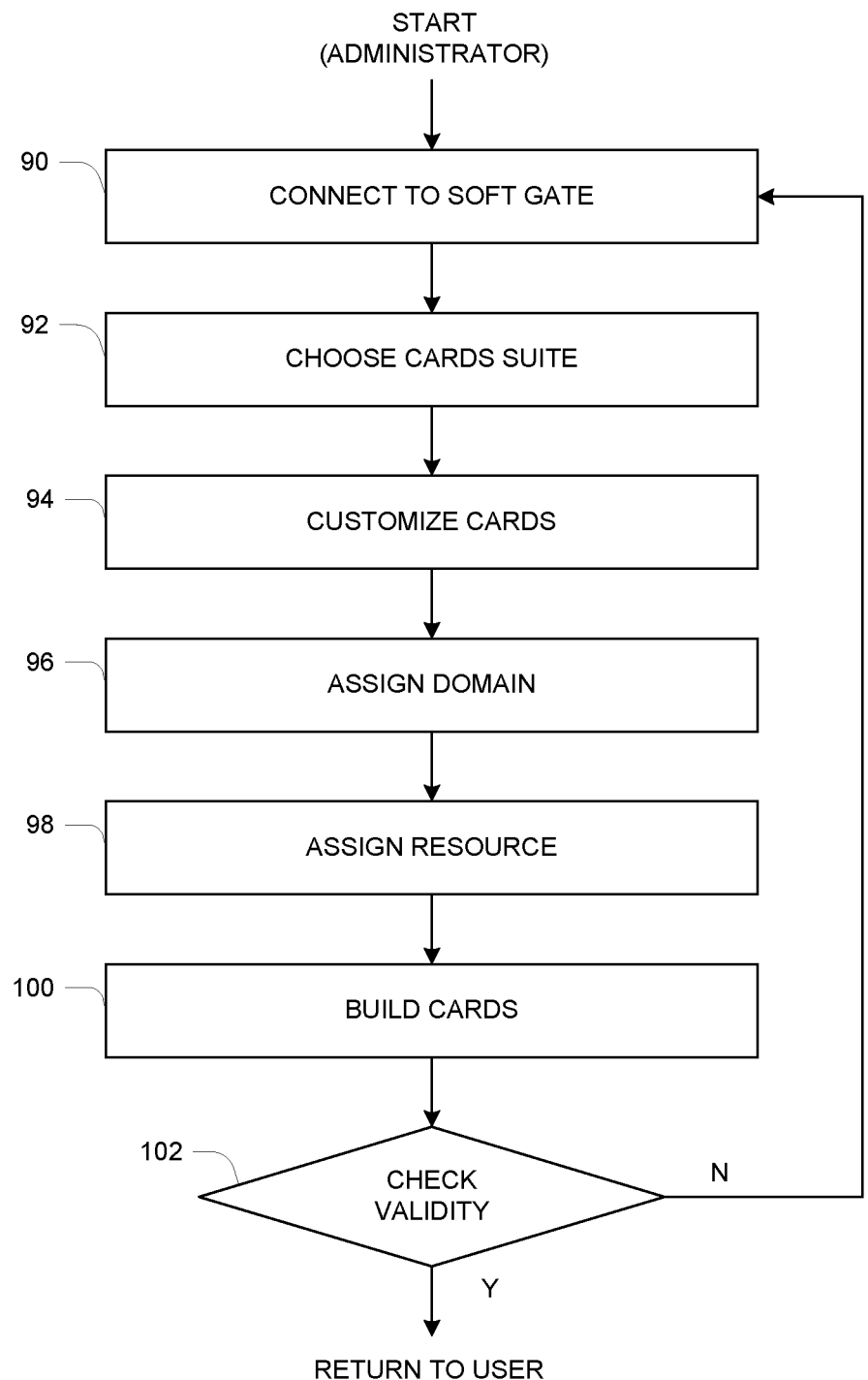
FIG. 6 is a flow diagram of creation of certification cards.
Figure 7:
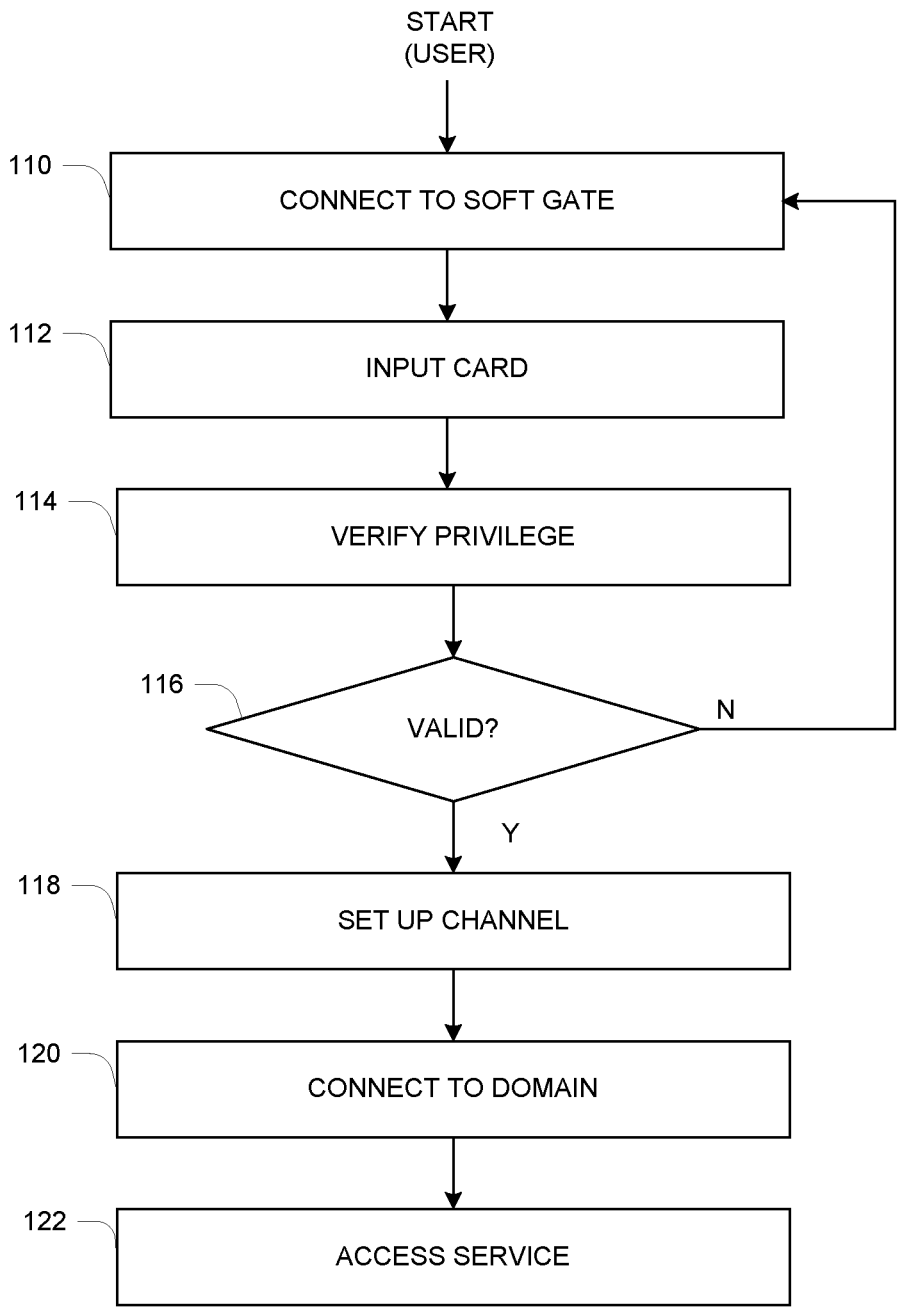
FIG. 7 is a flow diagram of use of certification cards.

FIGS. 6 and 7 illustrate two main flows for enterprises and individuals to deploy the V-E CCS 12: (1) Cards creation by the V-E CCS 12, and (2) Users access to the resources of V-E CCS 12.

FIG. 6 shows the flow of cards creation.

When an enterprise begins to deploy the V-E CCS 12, an administrator of the V-E CCS 12 vendor creates the following items for this enterprise: one enterprise administrator account for the enterprise, a set of specific cards, and one business domain 34 populated with resources. The enterprise administrator does the following to complete the configuration:
1. (Step 90) Connection to soft gate 22: the administrator connects to the soft gate 22 by a device such as a PC, laptop, tablet, or smartphone, specifically using a management window such as Web GUI and application client.
2. (Step 92) Choose Enterprise Cards Suite: according to the business of the enterprise, the administrator should choose the right cards from the sample suite.
3. (Step 94) Customize Cards: according to requirement from different business unit, the administrator customizes the cards' access privileges to specific IT resources.
4. (Step 96) Assign Domain: the administrator configure the cards with the specific business domain 34.
5. (Step 98) Assign Resource: the administrator configures the cards with specific resources and services.
6. (Step 100) Build Cards: after the above configuration, the administrator initiates an automated procedure to create final cards that reflect the above customization and configuration. As noted above, cards may be physical or digital.
7. (Step 102) Check validity: this step may be done by a background procedure during the creation process. If the parameters of the cards are all correct, the cards are created successfully. Otherwise, the administrator checks the configuration and re-builds the cards.

When the cards are created successfully, the administrator passes them to the enterprise (return to user). Typically there is a need for internal distribution. Thus when the enterprise receives the cards, it might distribute them to the heads of the various departments (IT, HR, etc.), who can further distribute the cards to individual users to enable their access to respective resources and services.

FIG. 7 shows the flow of card usage based on a request for access to a resource from a user, which includes the following:
1. (Step 110) Connect to soft gate 22: the individual can connect to the soft gate 22 by a user device, specifically using a user window such as Web GUI and Application Client.
2. (Step 112) Input Card: the individual provides a card
3. (Steps 114-116) Verify the privilege: the soft gate 22 checks the validity of the card. If invalid, then error information about forbidden access might be generated, and the process ends with respect to this card.
4. (Step 118) Set up Channel: when the card is valid, the channel management initializes the setting up of a communication channel and sends the request to resource pool 32.
5. (Step 120) Connect to Domain: domain management accepts the request and connects the individual to the specific business domain 34.
6. (Step 122) Access the Service: when the connection to the business domain 34 is built, the channel setup procedure can fetches the specific resource and service according to the description of the card.

Once the channel between the individual and the resource is built up, the individual utilizes the requested IT resource. Channel management might account for the usage in some manner, such as by measuring connection time, resource capacities (e.g. size of resource, number of transactions, etc.), etc. Usage limits may be utilized, such as maximum connection time. When the allowed usage time has elapsed, the individual re-validates the card if ongoing access to the service is desired.

The following are advantages that may be achieved:
1. Ensure information security of the usage of the enterprise and the resource and service accessed through VPN and Intranet.

2. Limited scope of privileges—an individual only can access the resource and service described by a card. The cards are the key for the enterprise to the V-E CCS 12.
3. V-E CCS 12 may be built on the business model of ITaaS. It builds a channel between the individuals in the enterprise and the cloud.
4. V-E CCS 12 may help enterprises to reduce the budget for IT resources and services.
5. The concepts herein can be applied to any type of cloud: private, community, public or hybrid.

While various embodiments of the invention have been particularly shown and described, it will be understood by those skilled in the art that various changes in form and details may be made therein without departing from the scope of the invention as defined by the appended claims.

What is claimed is:

1. A cloud computing system for providing network-delivered virtual-enterprise functionality to an enterprise, comprising:
    a first set of network computers providing a pool of virtual-enterprise resources integrated from lower-level cloud infrastructure including software as a service, platform as a service and infrastructure as a service, the software as a service including department-level applications and services, the platform as a service and infrastructure as a service including virtualized machines and data storage resources on which enterprise applications can be deployed;
    a second set of network computers configured to form a soft gate providing a route of access to the pool of virtual-enterprise resources by enterprise users accessing the cloud computing system via an external network; and
    a third set of network computers configured to form a business box providing for creation, management and use of certification cards to define the virtual-enterprise resources and to control use of the virtual-enterprise resources by the enterprise users,
    the soft gate and business box implementing a card-creation flow and a card-usage flow, the card-creation flow creating customized certification cards for the enterprise based on an administrator's selection and customization of generic certification cards, the card-usage flow providing validation of user privileges based on user presentation of the certification cards to the soft gate as a condition to user access to the virtual-enterprise resources
    wherein the soft gate includes a privilege management module, certification card parser, domain transmitter and channel management module, the privilege management module checking access privileges as described on certification cards provided to the soft gate, the card parser parsing card information and packing it with related parameters into a format recognizable by other components of the cloud computing system, the domain transmitter sending resource access requirements to the pool of virtual-enterprise resources, and the channel management module tracking usage of communications channels between the enterprise users and resources in the pool of virtual-enterprise resources.

2. The cloud computing system of claim 1, wherein the certification cards are from a suite of enterprise certification cards for respective corporate individuals or organizations and provide definition of and access to corresponding service applications in the pool of virtual-enterprise resources.

3. The cloud computing system of claim 2, wherein the service applications include applications for information technology, human resources, finance, and sales, and wherein corresponding ones of the certification cards describe users' privileges with respect to the applications.

4. The cloud computing system of claim 1, wherein the soft gate implements an accounting function to track usage of resources by the enterprise users.

5. The cloud computing system of claim 1, wherein the business box includes a card request interface module, a card management module, and a resource distributor, the card request interface module providing an external application programming interface to the soft gate for communications with the business box, the card management module creating, modifying and deleting certification cards for different roles in the enterprise, and the resource distributor sending completed configuration files for the enterprise to the pool of virtual-enterprise resources to build a corresponding business domain of resources for use by the enterprise users.

6. The cloud computing system of claim 1, wherein the pool of virtual-enterprise resources includes a resource interface module, domain management module, resource management module, and business service management module, the resource interface module providing an external application programming interface for external requests to the resources, the domain management module controlling business domains built on a base of resources and services for respective enterprises, the resource management module maintaining resources including virtual machines, storage, and software usable by the enterprise users, the business service management module managing business service resources.

7. The cloud computing system of claim 6, wherein the business service resources include corporate department applications for information technology, human resources, finance, and sales.

8. The cloud computing system of claim 1, wherein the card-creation flow includes:
    accepting a connection from an enterprise administrator to the soft gate; and
    under control of the enterprise administrator:
        i) selecting an enterprise cards suite;
        ii) customizing selected cards according to requirements from business units, the cards being customized with respect to access privileges to specific IT resources;
        iii) configuring the selected cards with a specific business domain, the business domain being exclusively associated with the enterprise and including a collection of resources for use by the enterprise users of the enterprise;
        iv) configuring the selected cards with specific resources and services;
        v) after the above operations, performing an automated procedure to create final cards that reflect the above customization and configuration; and
        vi) confirming validity of the final cards.

9. The cloud computing system of claim 1, wherein the card usage flow includes:
    accepting a connection from an enterprise user with a request to access resources; and
    in response to the request from the enterprise user:
        i) accepting a certification card;
        ii) verifying access privileges on the certification card;
        iii) upon verifying the access privileges, (a) setting up a communication channel and sending the request to the pool of virtual-enterprise resources, (b) connecting the enterprise user to a specific business domain, the business domain being exclusively associated with the enterprise and including a collection of resources for use by the enterprise users of the enterprise, and (c) upon connecting the enterprise user to the specific business domain, fetching a specific resource or service according to a description on the certification card.

10. A method of structuring and operating a cloud computing system for providing network-delivered virtual-enterprise functionality to an enterprise, comprising:
providing, by a first set of network computers, a pool of virtual-enterprise resources integrated from lower-level cloud infrastructure including software as a service, platform as a service and infrastructure as a service, the software as a service including department-level applications and services, the platform as a service and infrastructure as a service including virtualized machines and data storage resources on which enterprise applications can be deployed;
providing, by a second set of network computers configured to form a soft gate, a route of access to the pool of virtual-enterprise resources by enterprise users accessing the cloud computing system via an external network; and
providing, by a third set of network computers configured to form a business box, for creation, management and use of certification cards to define the virtual-enterprise resources and to control use of the virtual-enterprise resources by the enterprise users,
the soft gate and business box implementing a card-creation flow and a card-usage flow, the card-creation flow creating customized certification cards for the enterprise based on an administrator's selection and customization of generic certification cards, the card-usage flow providing validation of user privileges based on user presentation of the certification cards to the soft gate as a condition to user access to the virtual-enterprise resources,
wherein the soft gate includes a privilege management module, certification card parser, domain transmitter and channel management module, the privilege management module checking access privileges as described on certification cards provided to the soft gate, the card parser parsing card information and packing it with related parameters into a format recognizable by other components of the cloud computing system, the domain transmitter sending resource access requirements to the pool of virtual-enterprise resources, and the channel management module tracking usage of communications channels between the enterprise users and resources in the pool of virtual-enterprise resources.

11. The method of claim 10, wherein the certification cards are from a suite of enterprise certification cards for respective corporate individuals or organizations and provide definition of and access to corresponding service applications in the pool of virtual-enterprise resources.

12. The method of claim 11, wherein the service applications include applications for information technology, human resources, finance, and sales, and wherein corresponding ones of the certification cards describe users' privileges with respect to the applications.

13. The method of claim 10, wherein the soft gate implements an accounting function to track usage of resources by the enterprise users.

14. The method of claim 10, wherein the business box includes a card request interface module, a card management module, and a resource distributor, the card request interface module providing an external application programming interface to the soft gate for communications with the business box, the card management module creating, modifying and deleting certification cards for different roles in the enterprise, and the resource distributor sending completed configuration files for the enterprise to the pool of virtual-enterprise resources to build a corresponding business domain of resources for use by the enterprise users.

15. The method of claim 10, wherein the pool of virtual-enterprise resources includes a resource interface module, domain management module, resource management module, and business service management module, the resource interface module providing an external application programming interface for external requests to the resources, the domain management module controlling business domains built on a base of resources and services for respective enterprises, the resource management module maintaining resources including virtual machines, storage, and software usable by the enterprise users, the business service management module managing business service resources.

16. The method of claim 15, wherein the business service resources include corporate department applications for information technology, human resources, finance, and sales.

17. The method of claim 10, wherein the card-creation flow includes:
accepting a connection from an enterprise administrator to the soft gate; and
under control of the enterprise administrator:
i) selecting an enterprise cards suite;
ii) customizing selected cards according to requirements from business units, the cards being customized with respect to access privileges to specific IT resources;
iii) configuring the selected cards with a specific business domain, the business domain being exclusively associated with the enterprise and including a collection of resources for use by the enterprise users of the enterprise;
iv) configuring the selected cards with specific resources and services;
v) after the above operations, performing an automated procedure to create final cards that reflect the above customization and configuration; and
vi) confirming validity of the final cards.

18. The method of claim 10, wherein the card usage flow includes:
accepting a connection from an enterprise user with a request to access resources; and
in response to the request from the enterprise user:
i) accepting a certification card;
ii) verifying access privileges on the certification card;
iii) upon verifying the access privileges, (a) setting up a communication channel and sending the request to the pool of virtual-enterprise resources, (b) connecting the enterprise user to a specific business domain, the business domain being exclusively associated with the enterprise and including a collection of resources for use by the enterprise users of the enterprise, and (c) upon connecting the enterprise user to the specific business domain, fetching a specific resource or service according to a description on the certification card.

* * * * *